United States Patent
Pong

(12) United States Patent (10) Patent No.: US 6,332,899 B1
Pong (45) Date of Patent: Dec. 25, 2001

(54) MODULARIZED METAL-AIR BATTERY AND METHOD FOR MANUFACTURING THE SAME

(76) Inventor: Ta-Ching Pong, 3F, No. 36, Lane 21, Lungchiang Rd., Taipei (TW)

( * ) Notice: Subject to any disclaimer, the term of this patent is extended or adjusted under 35 U.S.C. 154(b) by 0 days.

(21) Appl. No.: 09/359,421

(22) Filed: Jul. 23, 1999

(51) Int. Cl.[7] .............................. H01M 8/24; H01M 8/18; H01M 4/26
(52) U.S. Cl. .................. 29/623.5; 29/623.1; 429/27; 429/28; 429/34; 429/18; 429/19
(58) Field of Search ................ 429/27, 28, 34, 429/18, 19; 29/623.5, 623.1

(56) References Cited

U.S. PATENT DOCUMENTS

| | | | |
|---|---|---|---|
| 4,693,946 | * | 9/1987 | Niksa et al. .................. 429/28 |
| 4,842,963 | * | 6/1989 | Ross, Jr. .................. 429/27 |
| 4,885,217 | * | 12/1989 | Hoge .................. 429/27 |
| 5,318,861 | * | 6/1994 | Harats et al. .................. 429/27 |

* cited by examiner

Primary Examiner—Mark F. Huff
Assistant Examiner—Daborah Chacko-Davis
(74) Attorney, Agent, or Firm—Bacon & Thomas

(57) ABSTRACT

A modularized metal-air battery includes a metal-plate module, a first air-plate module and a second air-plate module. The metal-plate module has a metal anode enclosed in a frame that is thicker than the metal anode. Each of the first and second air-plate modules has an air cathode enclosed in a frame that is thicker than the air cathode. The first air-plate module, the metal-plate module and the second air-plate module are combined to constitute the metal-air battery in such a manner that the frames thereof are securely attached together thereby defining at least two chambers which are selectively filled with liquid electrolyte.

20 Claims, 18 Drawing Sheets

MODULARIZED METAL-AIR BATTERY AND METHOD FOR MANUFACTURING THE SAME

BACKGROUND OF THE INVENTION

1. Field of the Invention

The present invention relates to a metal-air battery, more particularly, to a modularized metal-air battery that is easy to manufacture and expand to provide the desired output voltage and energy capacity.

2. Description of Related Art

Typically, metal-air batteries are used to provide power for a long period of time. FIG. 16 schematically illustrates the structure of a conventional Zinc-air battery which has Zinc anode (161) positioned in a container (162). The container (162) has two substantially hollow faces (163), each being covered by an air cathode (164). Liquid electrolyte fills the container (162) such that the Zinc anode (161) is immersed therein. The air cathode (164) is formed by a piece of metal screen coated with air cathode material such as activated carbon. The inner side of the air cathode (164) is attached to a separator (165) that is made of non-woven cloth. Therefore, only air is allowed to flow through the air cathode (164) while the liquid electrolyte is kept in the container (162). With such an arrangement, a chemical reaction can be generated in the container (162) and electrical energy is accessed at the positive and negative electrical leads (166, 167). This conventional metal-air battery is not easy to manufacture because forming air cathodes (164) on a rectangular container (162) is difficult. Furthermore, to have an energy capacity and output voltage different from those of a single battery, multiple batteries have to be wired connected and a large space is required to hold these multiple batteries, resulting in inconvenience in using the metal-air batteries. Therefore, there is a need for the above metal-air battery to be improved.

SUMMARY OF THE INVENTION

One objective of the present invention is to provide a modularized metal-air battery that is comprised of multiple battery modules such that the metal-air battery is easy to expand to provide the desired output voltage and energy capacity.

Another objective of the present invention is to provide a method for manufacturing a modularized metal-air battery that is comprised of multiple battery modules, wherein each module is easy to be produced.

In accordance with one aspect of the present invention, the modularized metal-air battery includes at least one metal-plate module, a first air-plate module and a second air-plate module. The metal-plate module has a metal anode enclosed in a frame that is thicker than the metal anode. Each of the first and second air-plate modules has an air cathode enclosed in a frame that is thicker than the air cathode. The first air-plate module, the at least one metal-plate module and the second air-plate module are combined to constitute the metal-air battery in such a manner that the frames thereof are securely attached together one by one thereby defining at least two chambers which are selectively filled with liquid electrolyte.

In accordance with another aspect of the present invention, a method for manufacturing the modularized metal-air battery is provided. The method comprises processes for producing the air-plate module and the metal-plate module.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
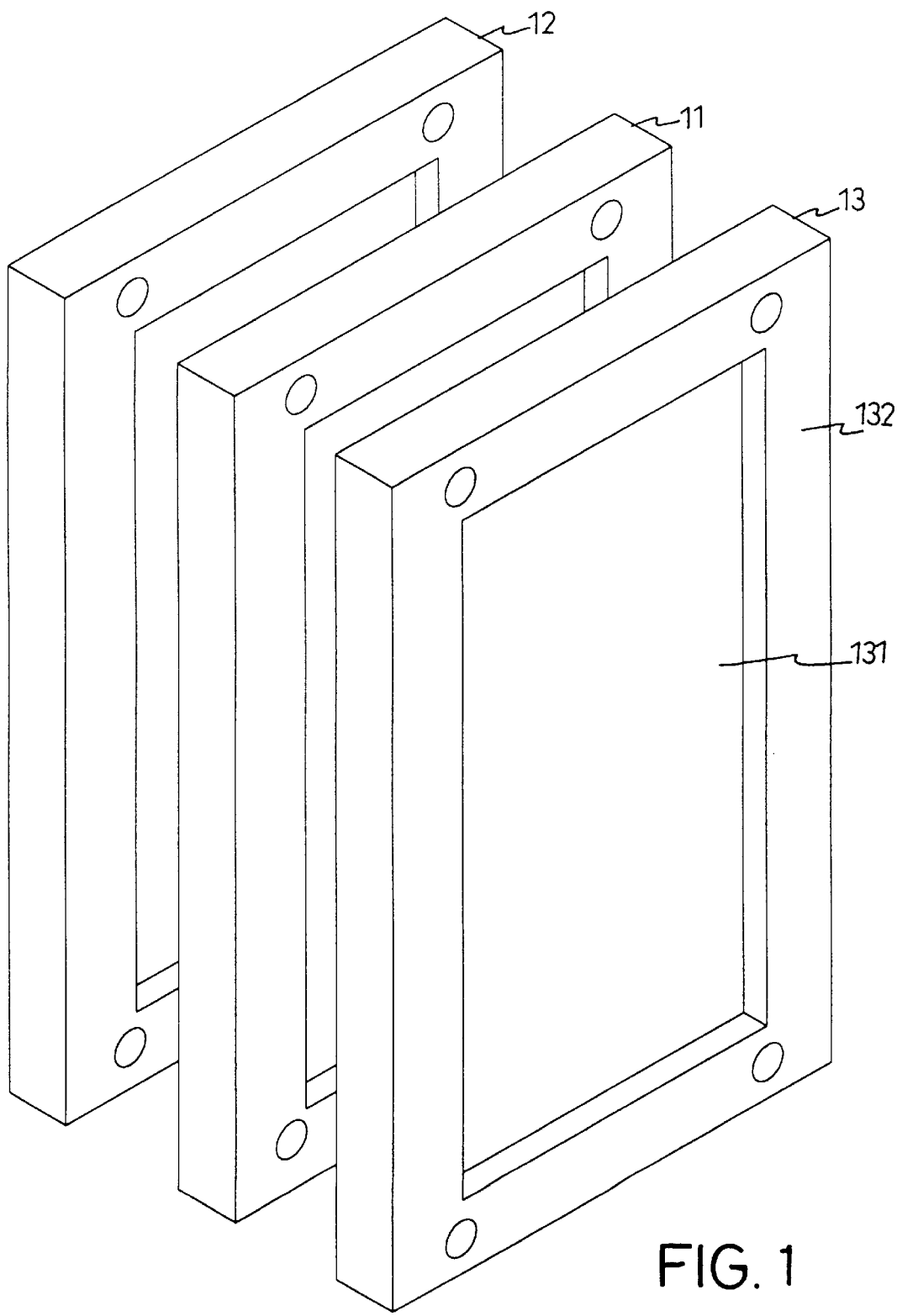
FIG. 1 is an exploded view of a modularized metal-air battery in accordance with the present invention.
Figure 2A:
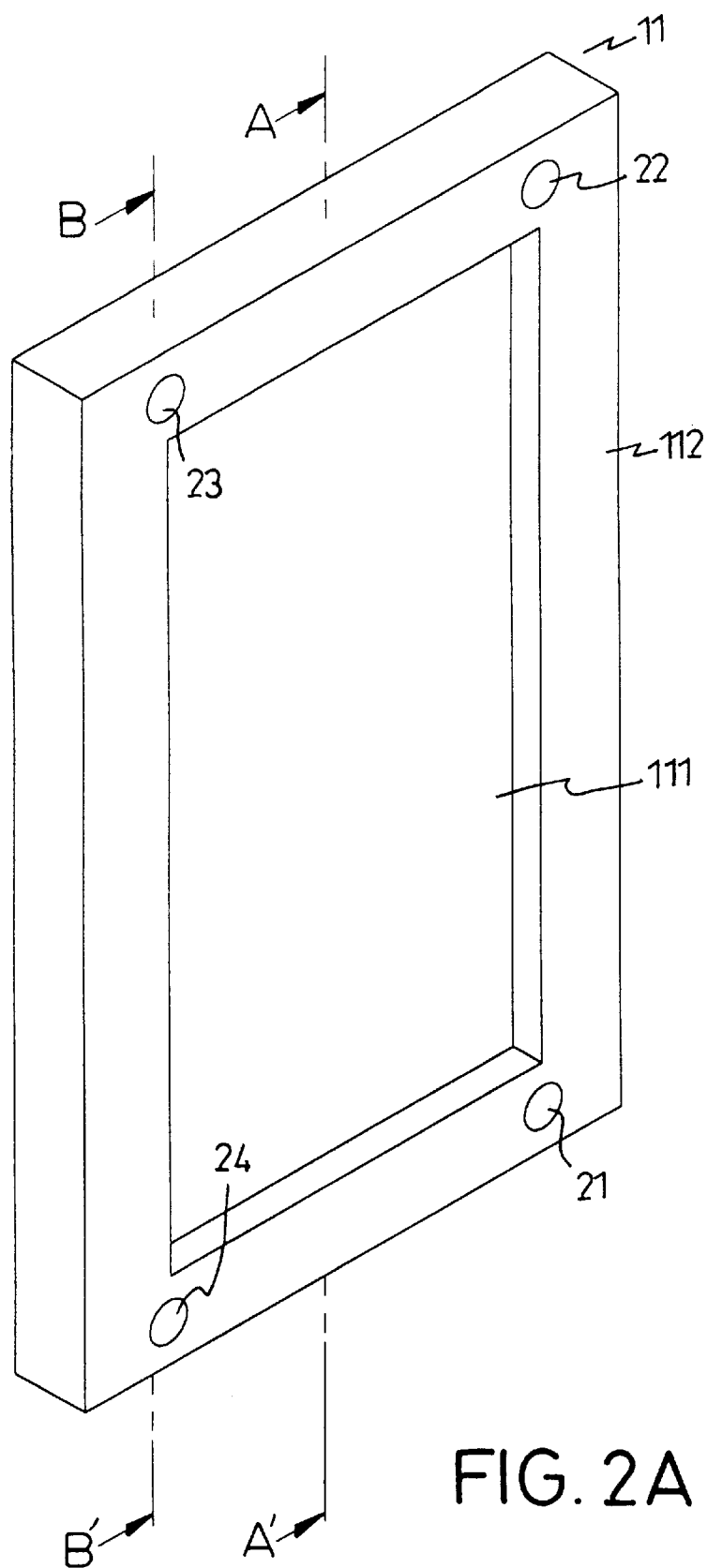
FIG. 2A is a perspective view of a metal-plate module shown in FIG. 1.
Figure 2B:
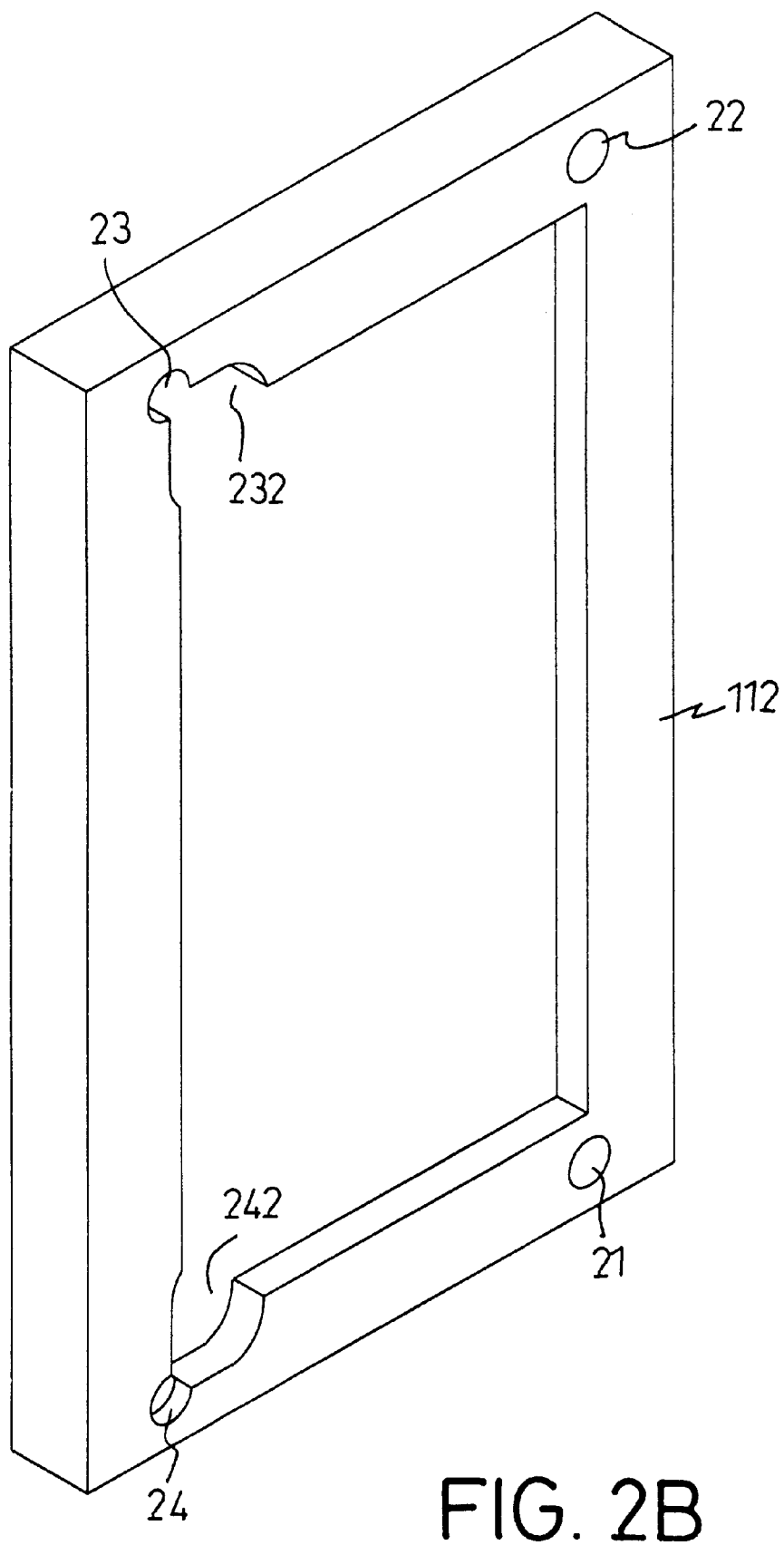
FIG. 2B is a perspective view of an alternative form of the metal-plate module shown in FIG. 1.
Figure 3A:
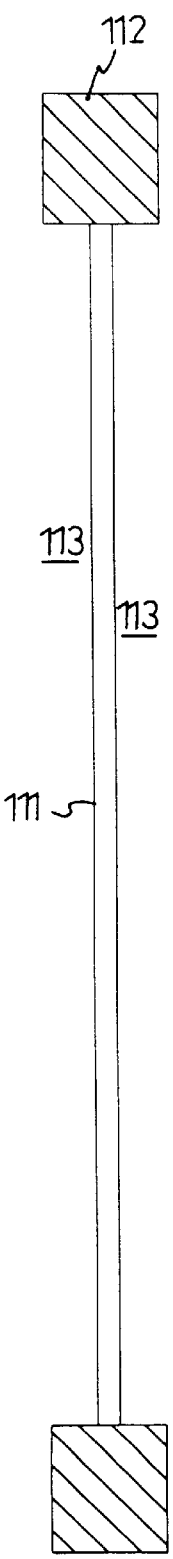
FIG. 3A is a cross sectional view along line AA' of the metal-plate module shown in FIG. 2.
Figure 3B:
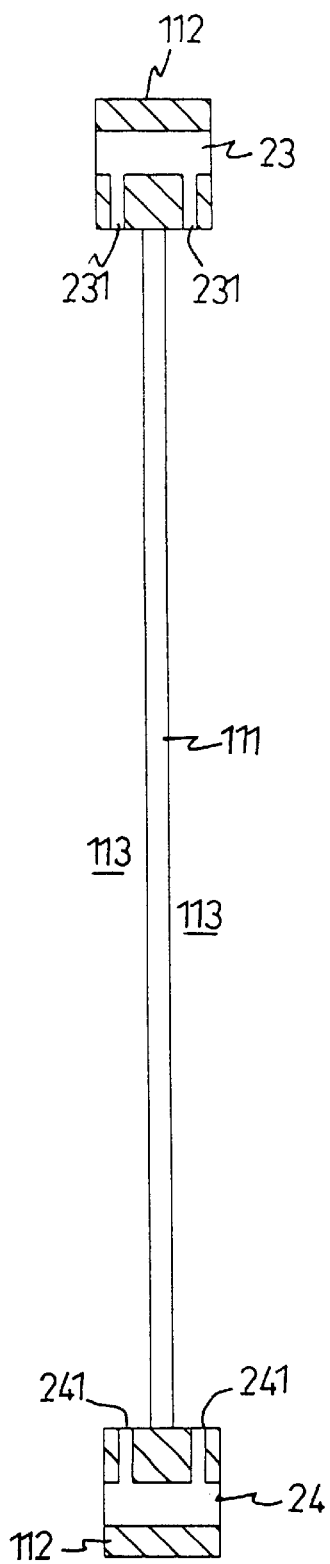
FIG. 3B is a cross sectional view along line BB' of the metal-plate module shown in FIG. 2.
Figure 4A:
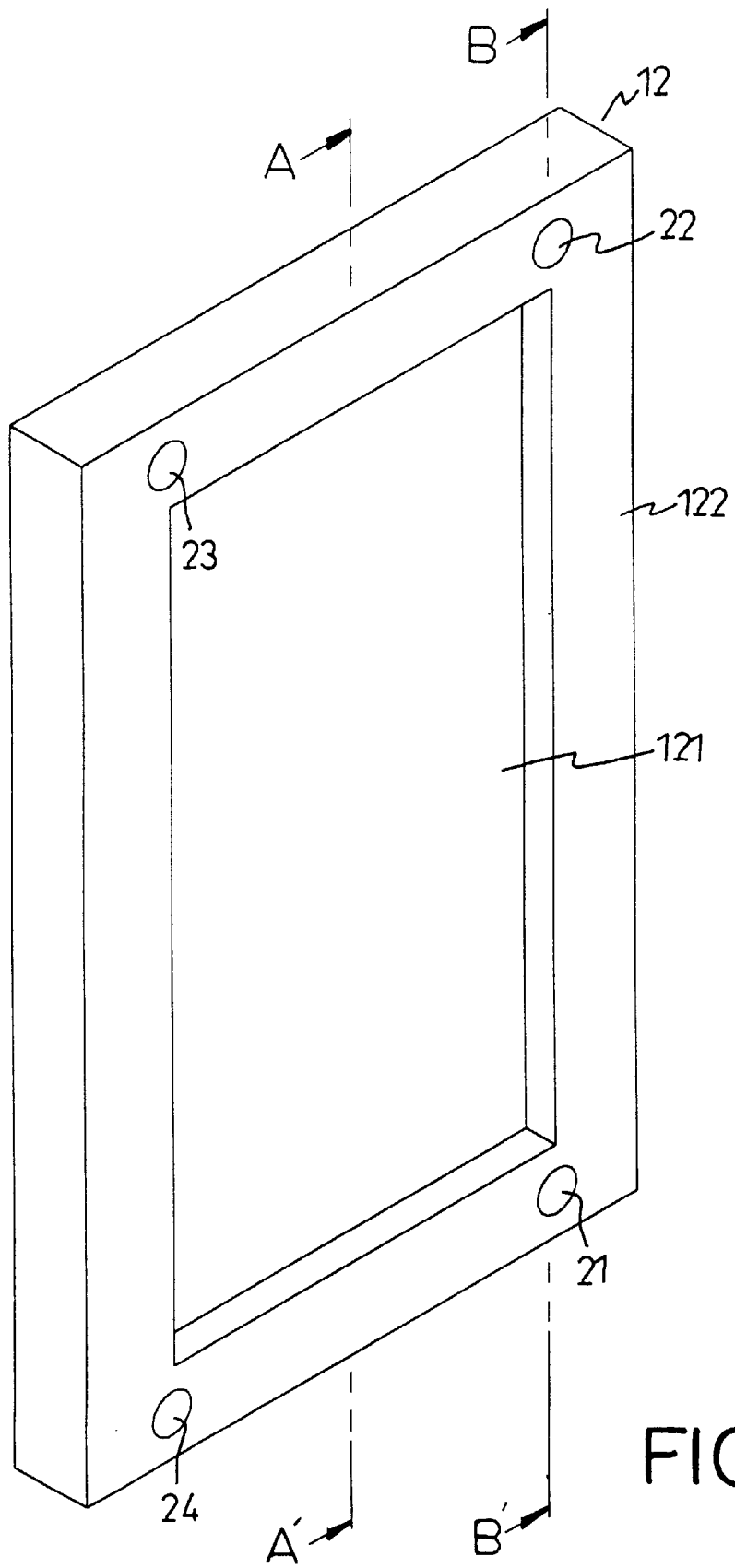
FIG. 4A is a perspective view of an air-plate module shown in FIG. 1.
Figure 4B:
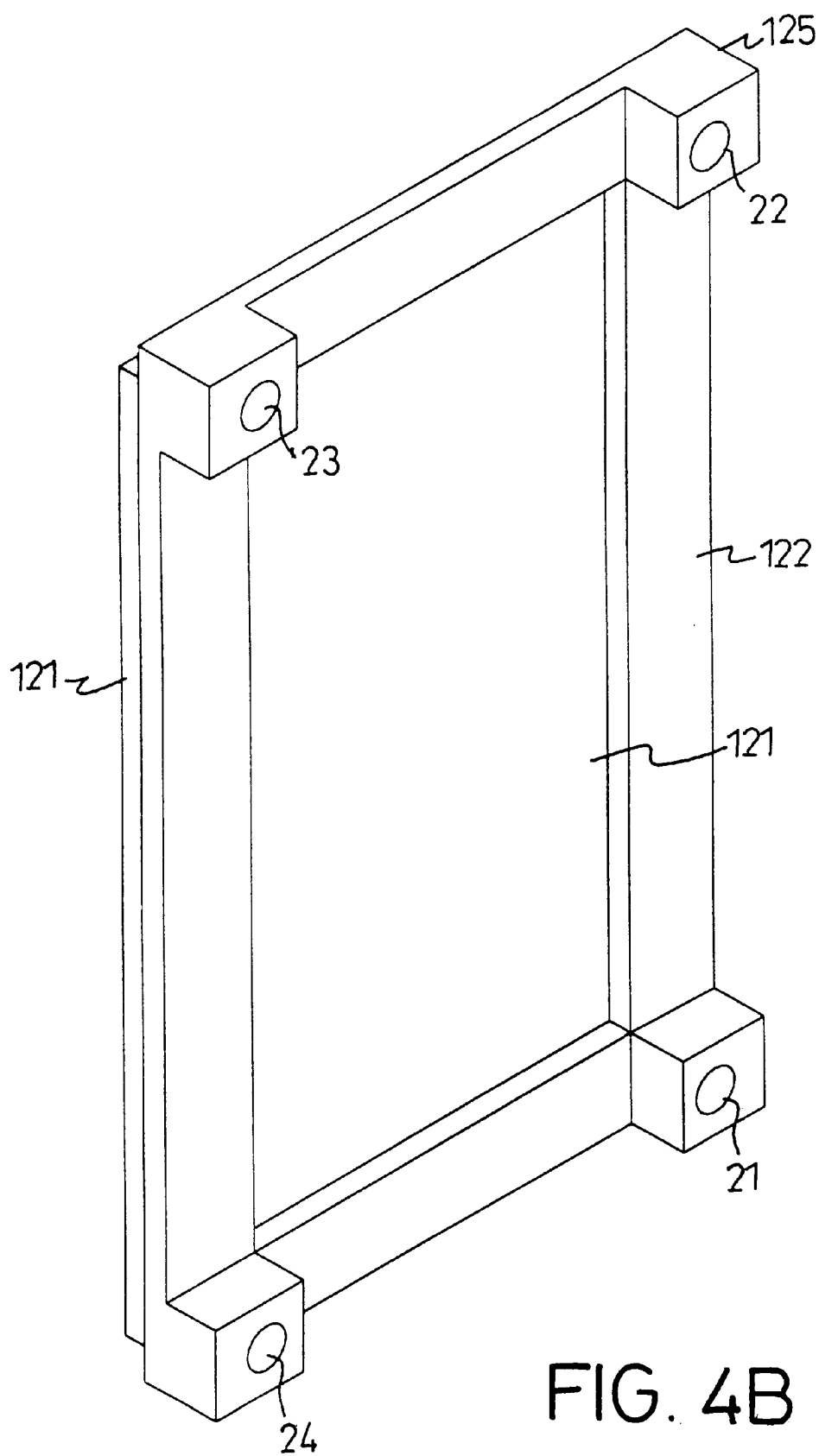
FIG. 4B is a perspective view of an alternative form of the air-plate module shown in FIG. 1.
Figures 5A, 5B:
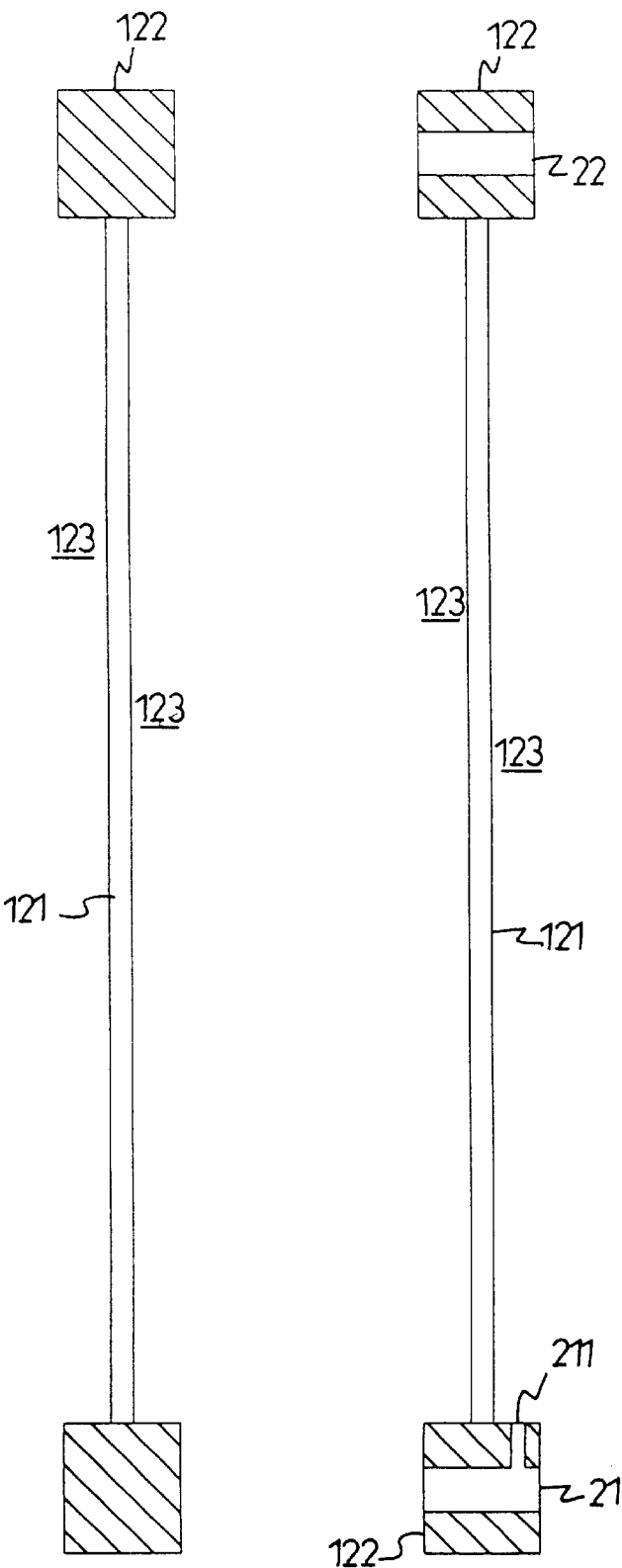
FIG. 5A is a cross sectional view along line AA' of the metal-plate module shown in FIG. 4.
FIG. 5B is a cross sectional view along line BB' of the metal-plate module shown in FIG. 4.

FIG. 1 is an exploded view of a modularized metal-air battery in accordance with the present invention, which includes a metal-plate module (11), a first air-plate module (12) and a second air-plate module (13), each having the same shape and dimensions as the other. With reference to FIG. 2, the metal-plate module (11) has a metal anode (11) enclosed in a frame (112). There are an air inlet channel (21), an air discharge channel (22), an electrolyte injection channel (23) and an electrode slurry discharge channel (24)

defined in the four corners of the frame (112/113). FIG. 3A, a cross sectional view along line AA' of the metal-plate module (11) shown in FIG. 2A, illustrates that the thickness of the frame (112) is larger than that of the metal anode (111) so that a space (113) is defined on each side of the metal anode (111). FIG. 3B, a cross sectional view along line BB' of the metal-plate module (11) shown in FIG. 2, illustrates that the frame (112) has electrolyte injection paths (231) defined between the electrolyte injection channel (23) and the spaces (113) so that the electrolyte injection channel (23) communicates with the spaces (113). Further, the frame (112) has electrode slurry discharge paths (241) defined between the electrode slurry discharge channel (24) and the spaces (113) so that the electrode slurry discharge channel (24) communicates with the spaces (113). Alternatively, as shown in FIG. 2B, a slurry discharge cutout (242) is defined in a corner of the frame (112) and the electrode slurry discharge channel (24) communicates with the spaces (113) via the slurry discharge cutout (242) instead of defining the slurry discharge paths (241). Similarly, a electrolyte injection cutout (232) is defined in a corner of the frame (112) and the electrolyte injection channel (23) communicates with the spaces (113) via the electrolyte injection cutout (232) instead of defining the electrolyte injection paths (231). FIG. 4 shows a perspective view of the first air-plate module (12), which has an air cathode (121) enclosed in a frame (122). There are an air inlet channel (21), an air discharge channel (22), an electrolyte injection channel (23) and an electrode slurry discharge channel (24) defined in the four corners of the frame (122). FIG. 5A, a cross sectional view along AA' of the first air-plate module (12) shown in FIG. 4, illustrates that the thickness of the frame (122) is larger than that of the air cathode piece (121) so that a space (123) is defined on each side of the air cathode (121). FIG. 5B, a cross sectional view along BB' of the first air-plate module (12) shown in FIG. 4, illustrates that the frame (122) has an air inlet path (211) defined between the air inlet channel (21) and the space (123) so that the air inlet channel (21) communicates with the space (123). Alternatively, similar to frame (112) of the metal-plate module (11), an air inlet cutout (not shown) may be defined in a corner of the frame (122) such that the air inlet channel (21) can communicate with the space (123) via the air inlet cutout instead of defining the air inlet path (211). Further, the air cathode (121) is not restricted to being enclosed in the frame (22). It is also applicable to have the air cathode (121) attached to a sideface of the frame (22). FIG. 4B shows another form of the air-plate module (12), wherein, at one sideface of the frame (122), there are four protruded portions (125) integrally formed on the four corners of the frame (122), and the air cathode (121) is attached to the other sideface of the frame (122).

Referring to FIG. 1 again, the second air-plate module (13) that includes an air cathode (131) enclosed in a frame (132) has the same structure as the first air-plate module (12).

Figure 6:
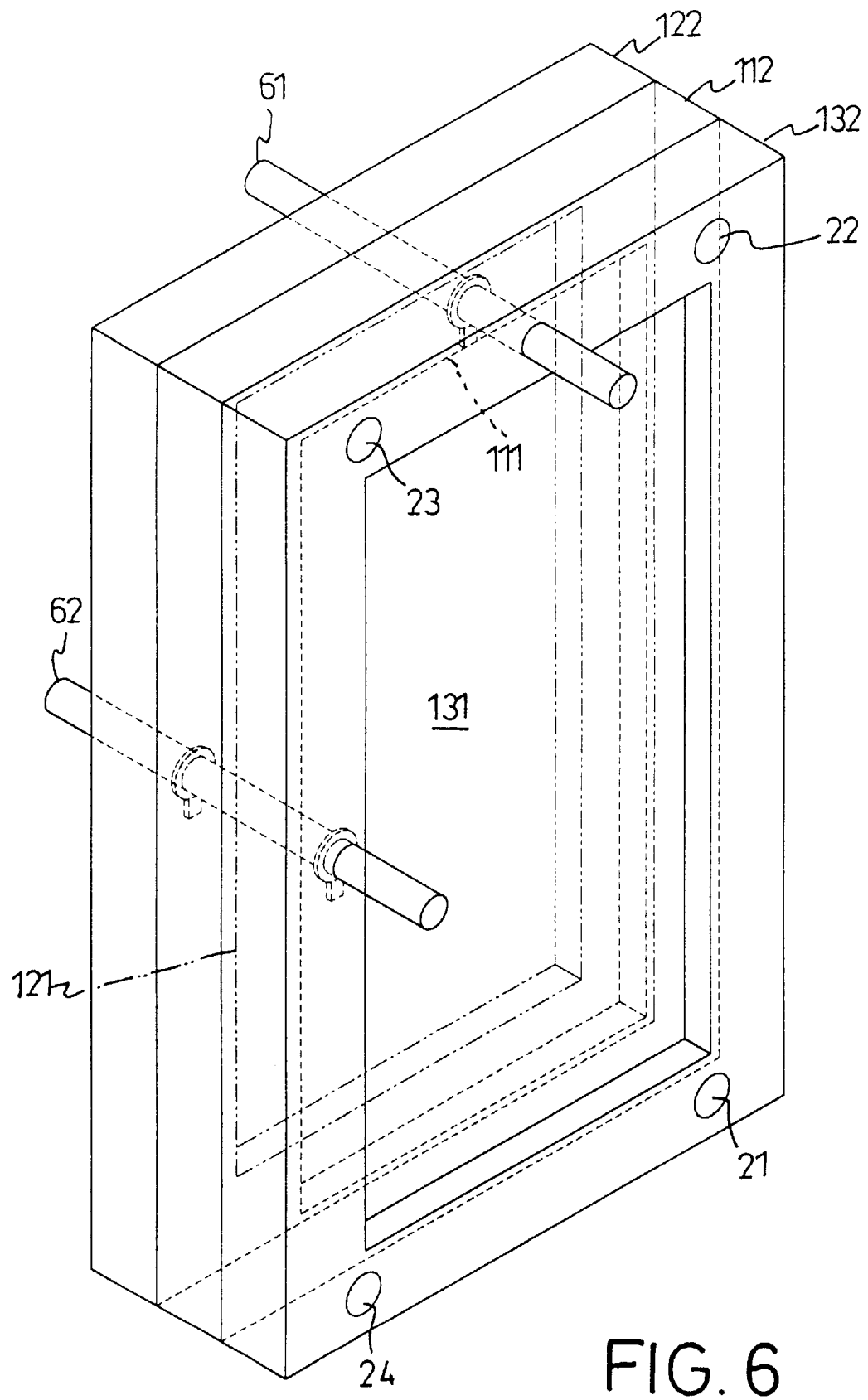
FIG. 6 is a perspective view of a modularized metal-air battery in accordance with the present invention.
Figure 7:
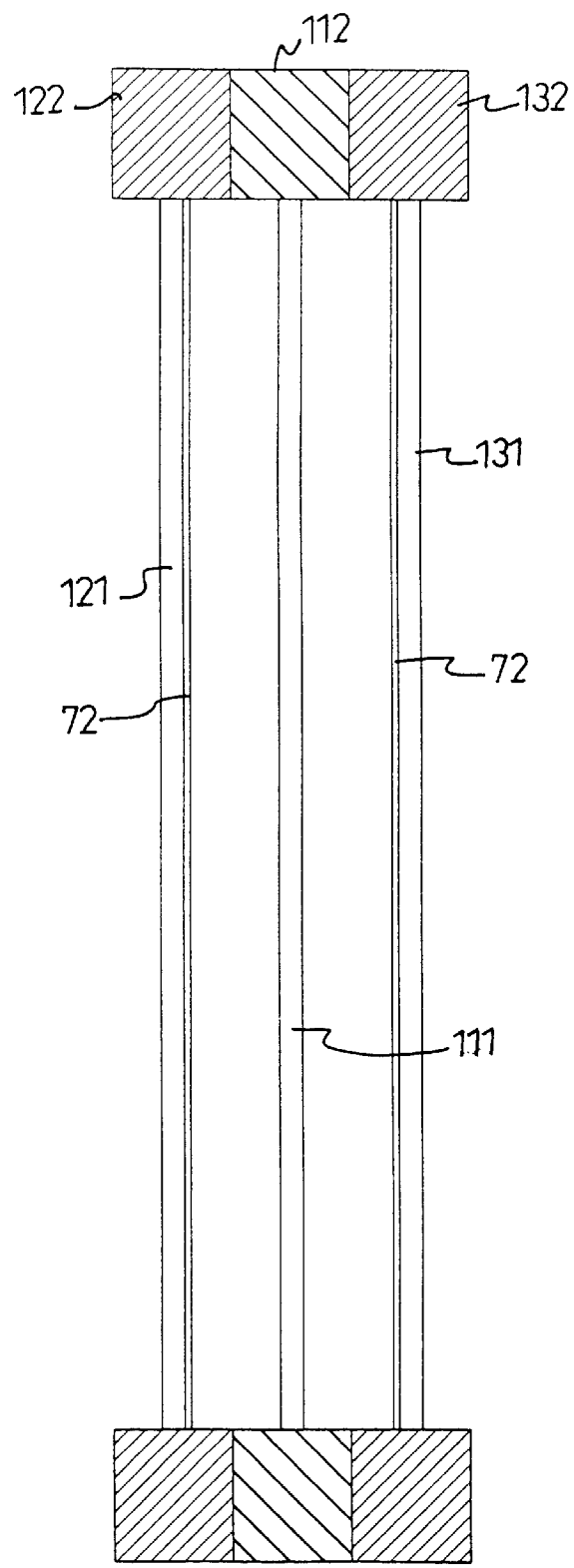
FIG. 7 is a side cross sectional view of the modularized metal-air battery shown in FIG. 6.

The metal-plate module (11) is clamped between the first air-plate module (12) and the second air-plate module (13) to form a metal-air battery in such a manner that the frames (122, 112, 132) thereof are securely attached together, as shown in FIG. 6. All of the air inlet channels (21) of the frames (122, 112, 132) are aligned. Similarly, all of the air discharge channels (22), all of the electrolyte injection channels (23) and all of the electrode slurry discharge channels (24) are respectively aligned. Consequently, with reference to FIG. 7, which is a cross sectional view of the metal-air battery shown in FIG. 6, two chambers (71), separated by the metal anode (111), are defined in the metal-air battery. Liquid electrolyte fills the two chambers (71) via the electrolyte injection channels (23) and the electrolyte injection paths (231) (or the electrolyte injection cutout (232)), while electrode slurry generated by metal-air battery in a discharging process is discharged via the electrode slurry discharge path (241) (or the electrode slurry discharge cutout (242)) and the electrode slurry channels (24). Further, it is shown that each air cathode (121, 131) is attached to a separator (72) which allows the air to flow into the chambers (71) while preventing the electrolyte from flowing over the air cathodes (121, 131).

With reference to FIG. 6 again, the metal-air battery is provided with a positive electrical lead (61) and a negative electrical lead (62), each penetrating through the frames (122, 112, 132). The positive electrical lead (61) is electrically connected to the metal anode (111) and the negative electrical lead (62) is electrically connected to the air cathodes (121, 131). Accordingly, battery power can be accessed via the positive and the negative electrical leads (61, 62).

Figure 8:
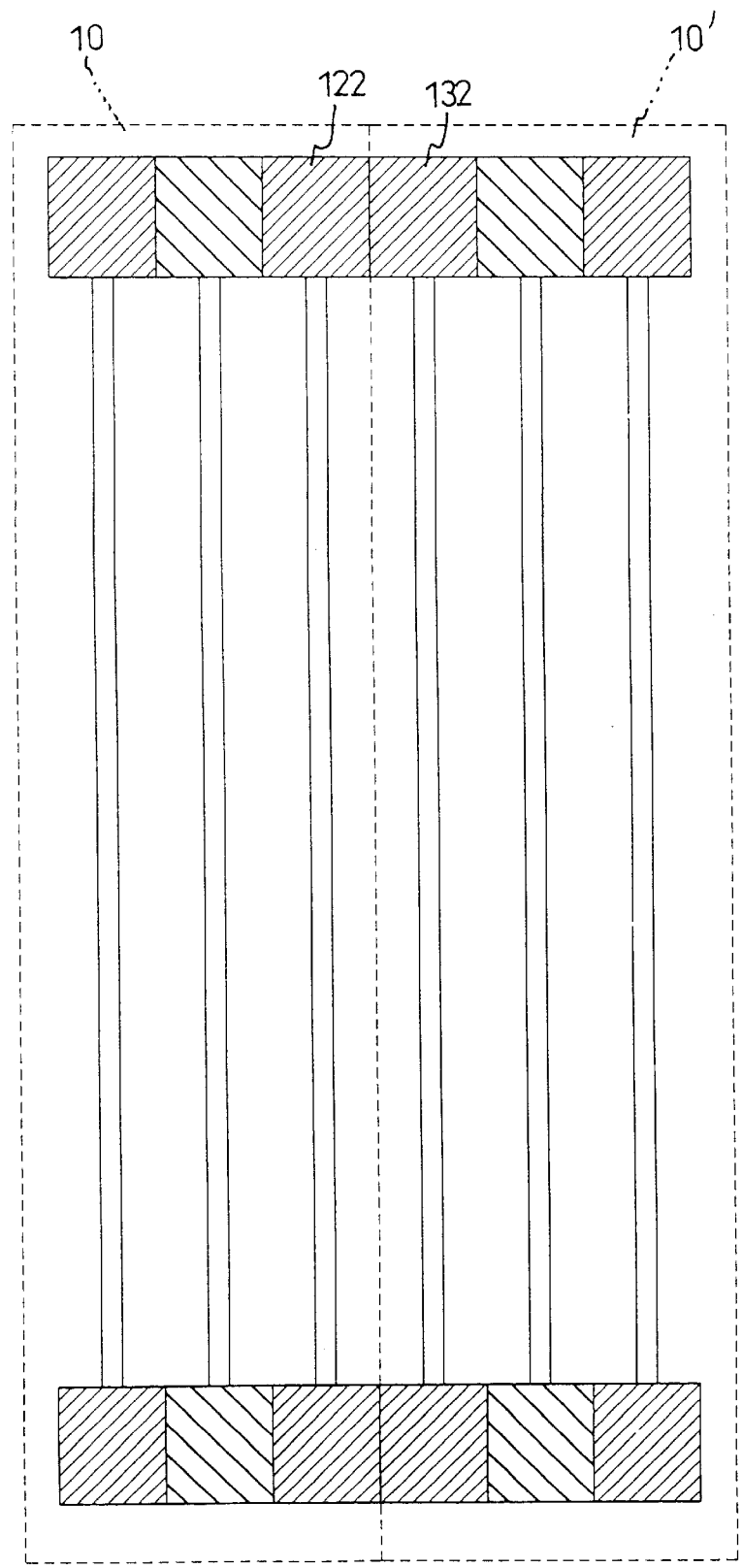
FIG. 8 shows a battery set having two modularized metal-air batteries in accordance with the present invention combined together.
Figure 9:
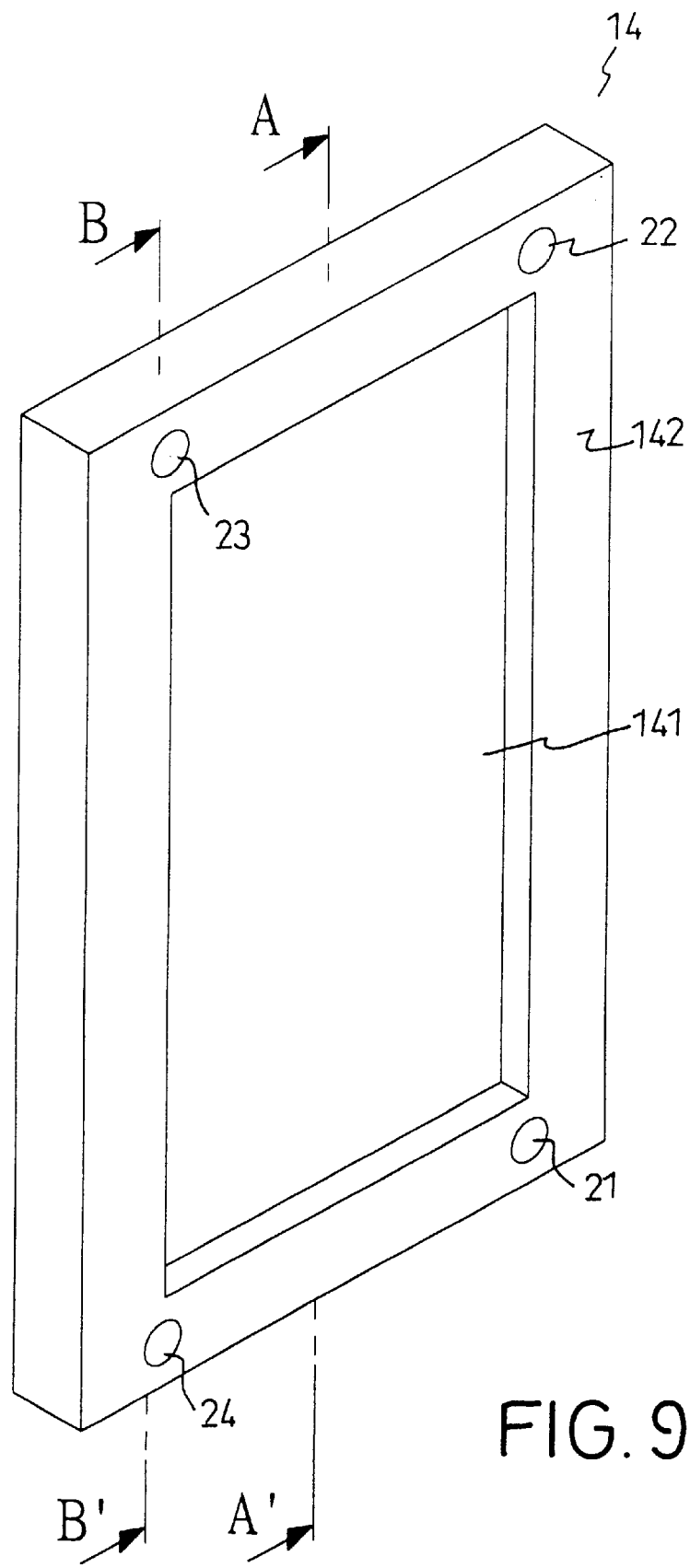
FIG. 9 is a perspective view of a regenerating-plate module in accordance with the present invention.
Figure 10A:
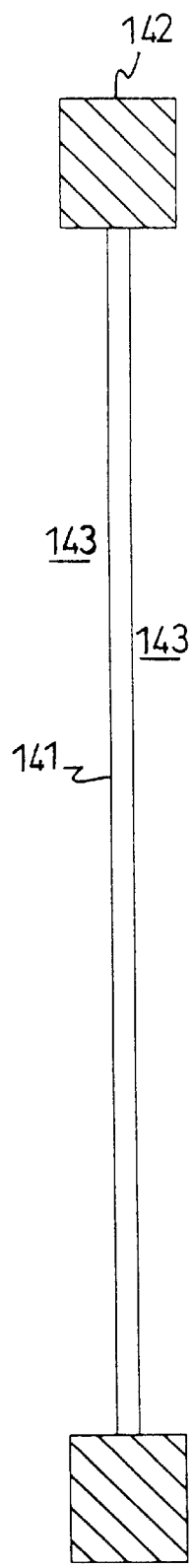
FIG. 10A is a cross sectional view along line AA' of the metal-plate module shown in FIG. 9.
Figure 10B:
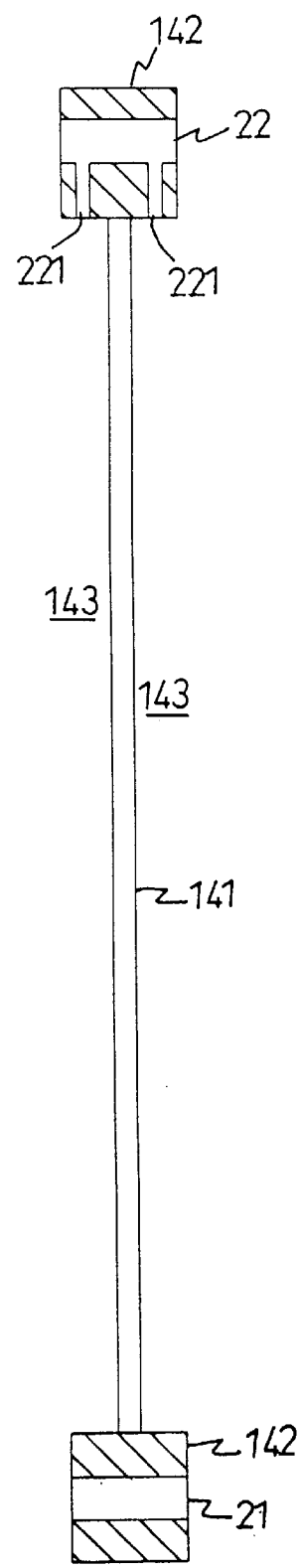
FIG. 10B is a cross sectional view along line BB' of the metal-plate module shown in FIG. 9.

The above described metal-air battery is provided with predetermined values of the output voltage level and energy capacity. However, if different values are desired, two or more such metal-air batteries can be easily combined together in a manner similar to combining the air-plate modules (12, 13) with the metal-plate module (11). To combine the above described metal-air battery (10) with an identical metal-air battery (10') as shown in FIG. 8, the frame (122) of the first metal-air battery (10) is attached to the frame (132) of the second metal-air battery (10') thereby combining the two batteries (10, 10'). Fresh air can be applied to the chamber (80) between the two batteries (10, 10') via the air inlet channels (21) and the air inlet path (211). The metal-air battery (10) can be converted to a rechargeable battery by including one or more regenerating-plate modules (14). The structure of the regenerating-plate module (14) is shown in FIG. 9. Similar to the metal-plate module (11) and the air-plate module (12, 13), the regenerating module (14) has a metal screen (141) enclosed in a frame (142). There are an air inlet channel (21), an air discharge channel (22), an electrolyte injection channel (23) and an electrode slurry discharge channel (24) defined in the four corners of the frame (142). FIG. 10A, a cross sectional view along AA' of the regenerating-plate module (14) shown in FIG. 9, illustrates that the frame (142) is thicker than the metal screen (141) so that a space (143) is defined on each side of the metal screen (141). FIG. 10B, a cross sectional view along BB' of the regenerating-plate module (14) shown in FIG. 9, illustrates that the frame (142) has air discharge paths (221) defined between the air discharge channel (22) and the spaces (143) so that the air discharge channel (22) communicates with the spaces (143). Alternatively, similar to frame (112) of the metal-plate module (11), an air discharge cutout (not shown) may be defined in a corner of the frame (142) such that the air discharge channel (22) can communicate with the spaces (143) via the air discharge cutout instead of defining the air discharge paths (221).

Figure 11:
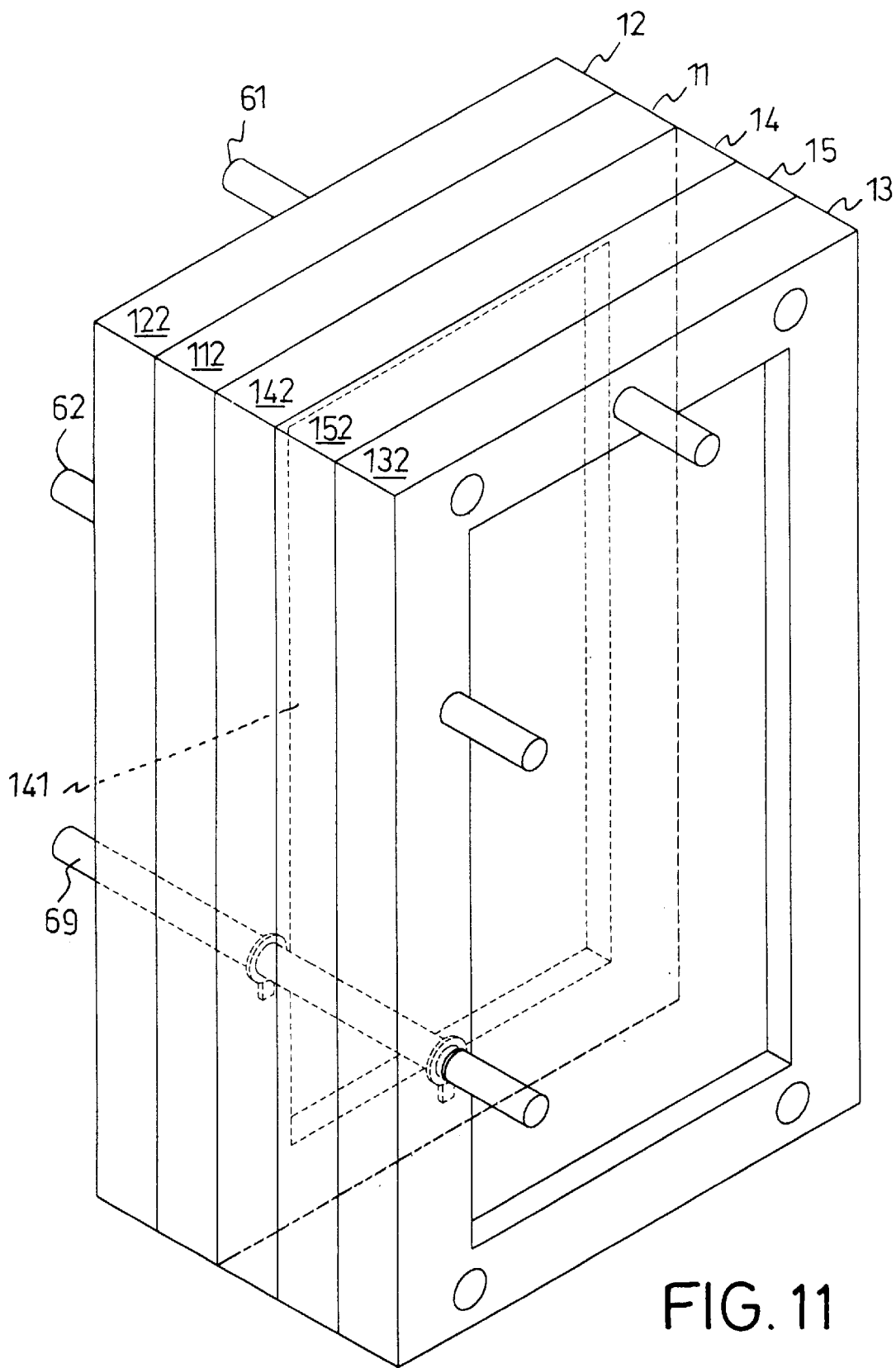
FIG. 11 is a perspective view of a rechargeable modularized metal-air battery in accordance with the present invention.
Figure 12:
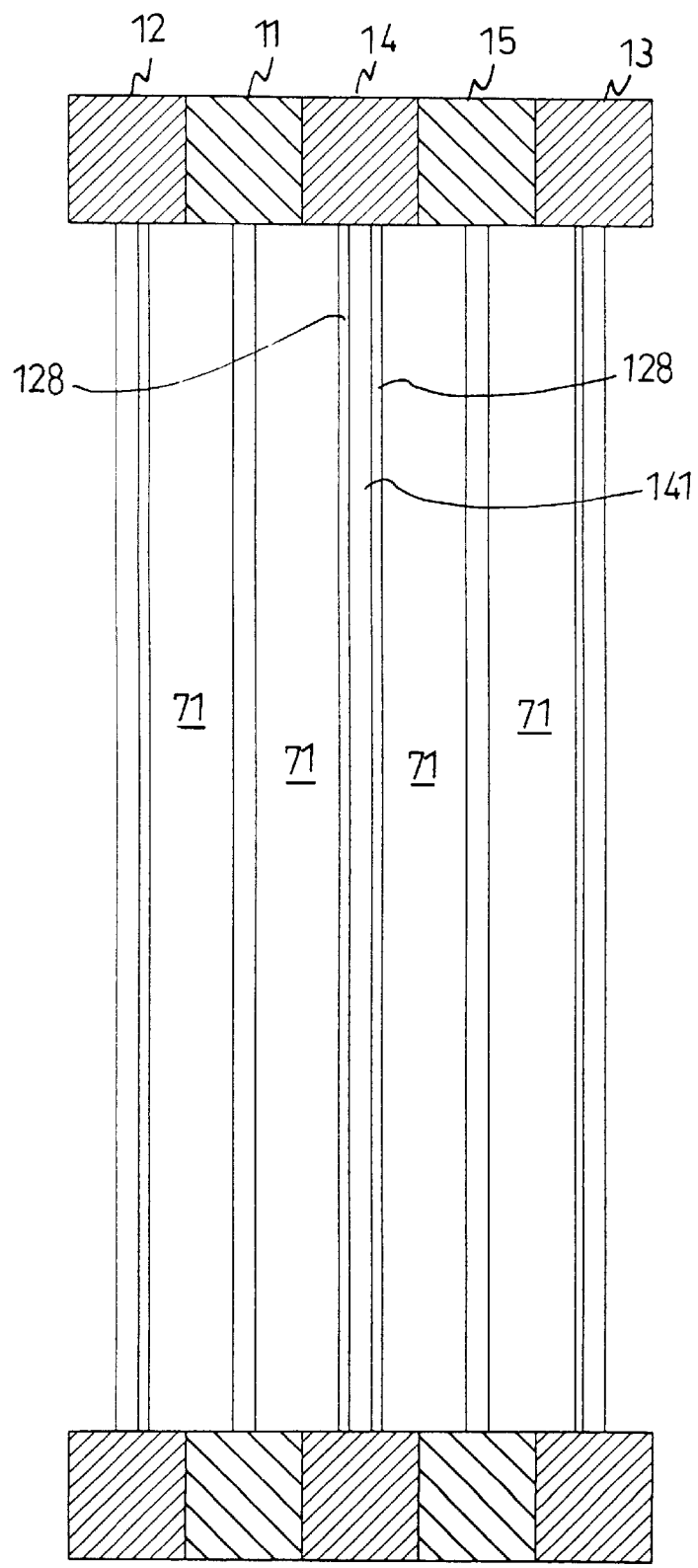
FIG. 12 is a side cross sectional view of the modularized metal-air battery shown in FIG. 11.

FIG. 11 shows a perspective view of a rechargeable metal-air battery which includes a first air-plate module (12), a first metal-plate module (11), a regenerating-plate module (14), a second metal-plate module (15) and a second air-plate module (13) sequentially combined together. With reference to FIG. 12, there are four chambers (71) defined in the rechargeable metal-air battery, which are filled with liquid electrolyte. Two separators (128) are attached to the faces of the metal screen (141) to avoid a short-circuit in the charging process. Referring to FIG. 11 again, the rechargeable metal-air battery is provided with a regenerating lead

(69) penetrating through the frames (122, 112, 142, 152, 132). The regenerating lead (69) is electrically connected to the metal screen (141). Accordingly, the battery can be recharged via the positive electrical lead (61) and the regenerating lead (69). The oxygen and fumes that are generated in the recharging process can be discharged via the air discharge channels (22) and the air discharge path (221), the fume can then be guided through suitable condensation device to extract the water content from the fume to prevent most of it be released out of the battery system. Thereby, the electrolyte density inside the battery system can be maintained in suitable range longer in time. The rechargeable metal-air battery is not restricted by the above structure. It is also possible to form a rechargeable metal-air battery by sequentially combining a first air-plate module, a first regenerating-plate module, a metal-plate module, a second regenerating-plate module and a second air-plate module, or by sequentially combining a first air-plate module, a first metal-plate module, a first regenerating-plate module, a second metal-plate module, a second regenerating-plate module, a third metal-plate module and a second air-plate module.

Again, two or more of the above-described rechargeable metal-air batteries can be conveniently combined to have the desired output voltage and battery capacity.

Figure 13:
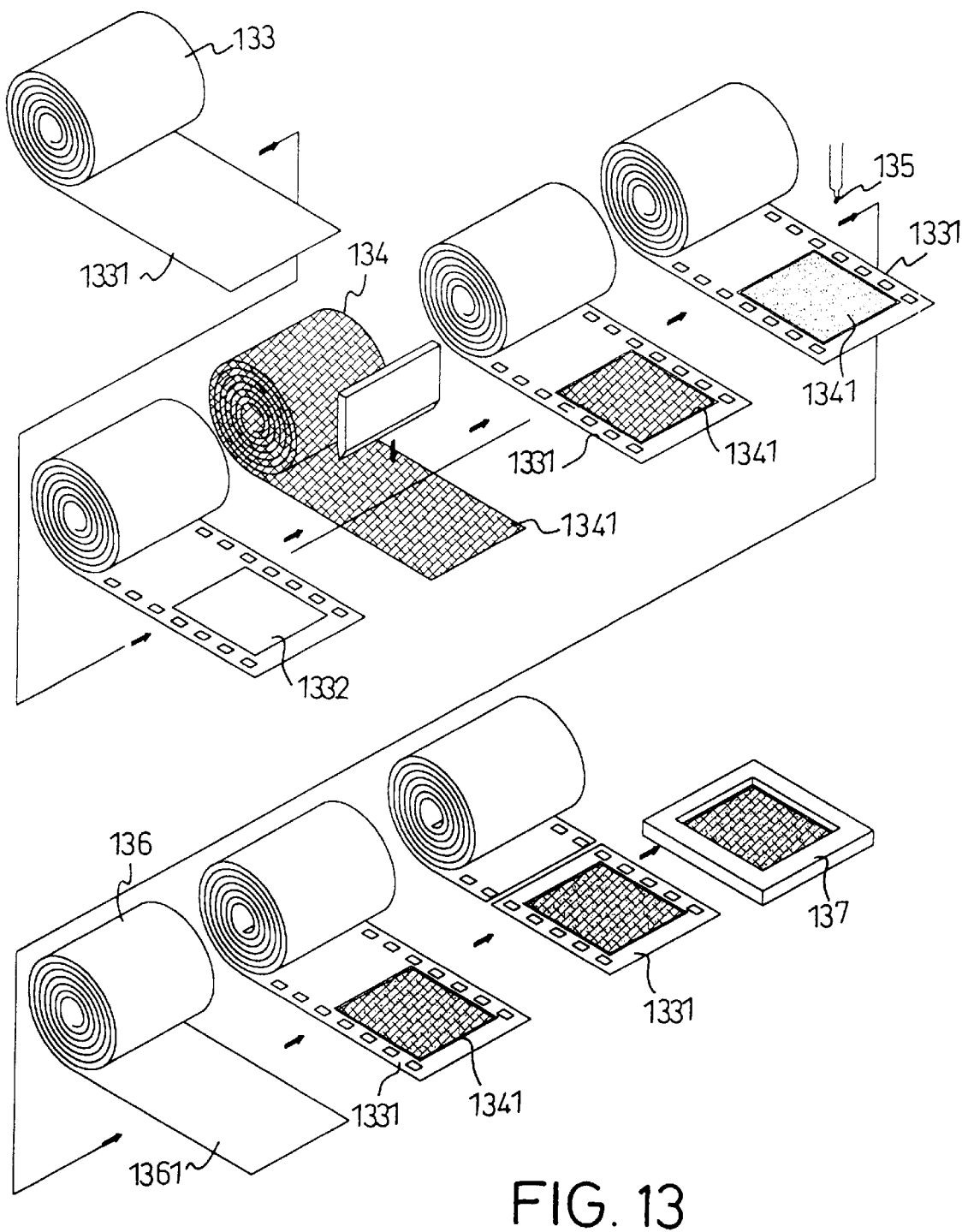
FIG. 13 shows a process for producing an air-plate module in accordance with the present invention.

The structure of the aforementioned metal-air battery or rechargeable metal-air battery is suitable for mass production. FIG. 13 shows the process for producing an air-plate module, which first provides a piece of film (1331) made of polyester, polyamide or the like from a roll of film (133). The piece of film is punched to have an aperture (1332) defined therein. A piece of metal screen (1341) is then provided by separating it from a roll of metal screen (134). The piece of metal screen (1341) is attached to the piece of film (1331) such that the aperture (1332) is covered by the piece of metal screen (1341). Air cathode material (135) is then coated on the piece of metal screen (1341) attached to the piece of film (1331). Afterwards, a separator (1361) is provided by separating it from a roll of separator (136). The separator (1361) is attached to the piece of metal screen (1341). Finally, the film (1331) is separated from the roll of film (133) and enclosed in a frame (137) to form an air-plate module. Because the film in a roll is particularly suitable for automated manufacturing, mass production of the air-plate module (12) is possible.

Figure 14:
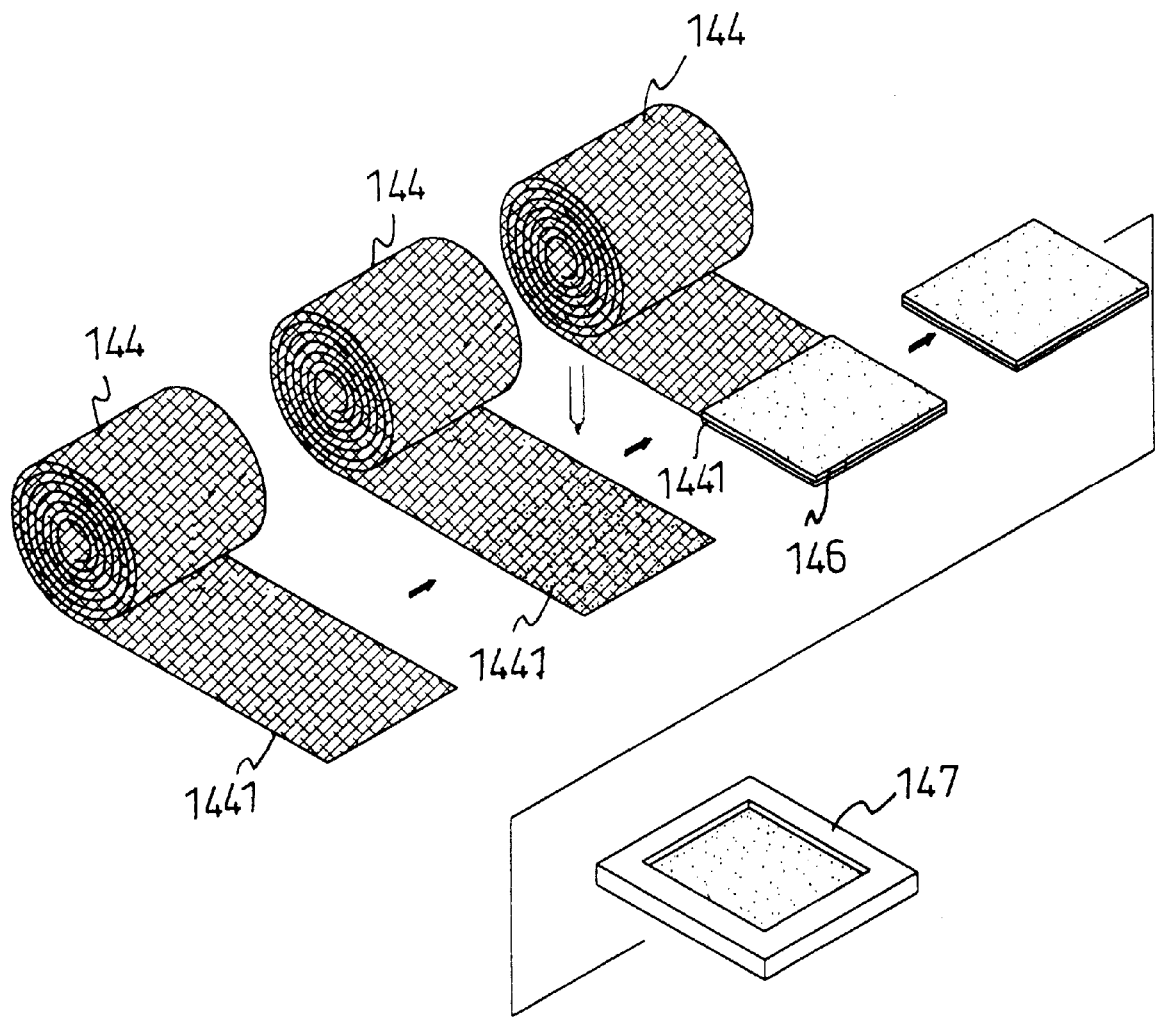
FIG. 14 shows a process for producing a metal-plate module in accordance with the present invention.

FIG. 14 shows a process for producing the metal-plate module, which first provides a metal screen (1441) from a roll of metal screen (144). Metal powder (145) is then plastered onto the piece of metal screen (1441). Afterwards, the metal powder (145) on the piece of metal screen (1441) is pressed to form a metal plate (146). Finally, metal screen (1441) is separated from the roll of metal screen (144) and enclosed in a frame (147) to from the metal-plate module.

Figure 15:
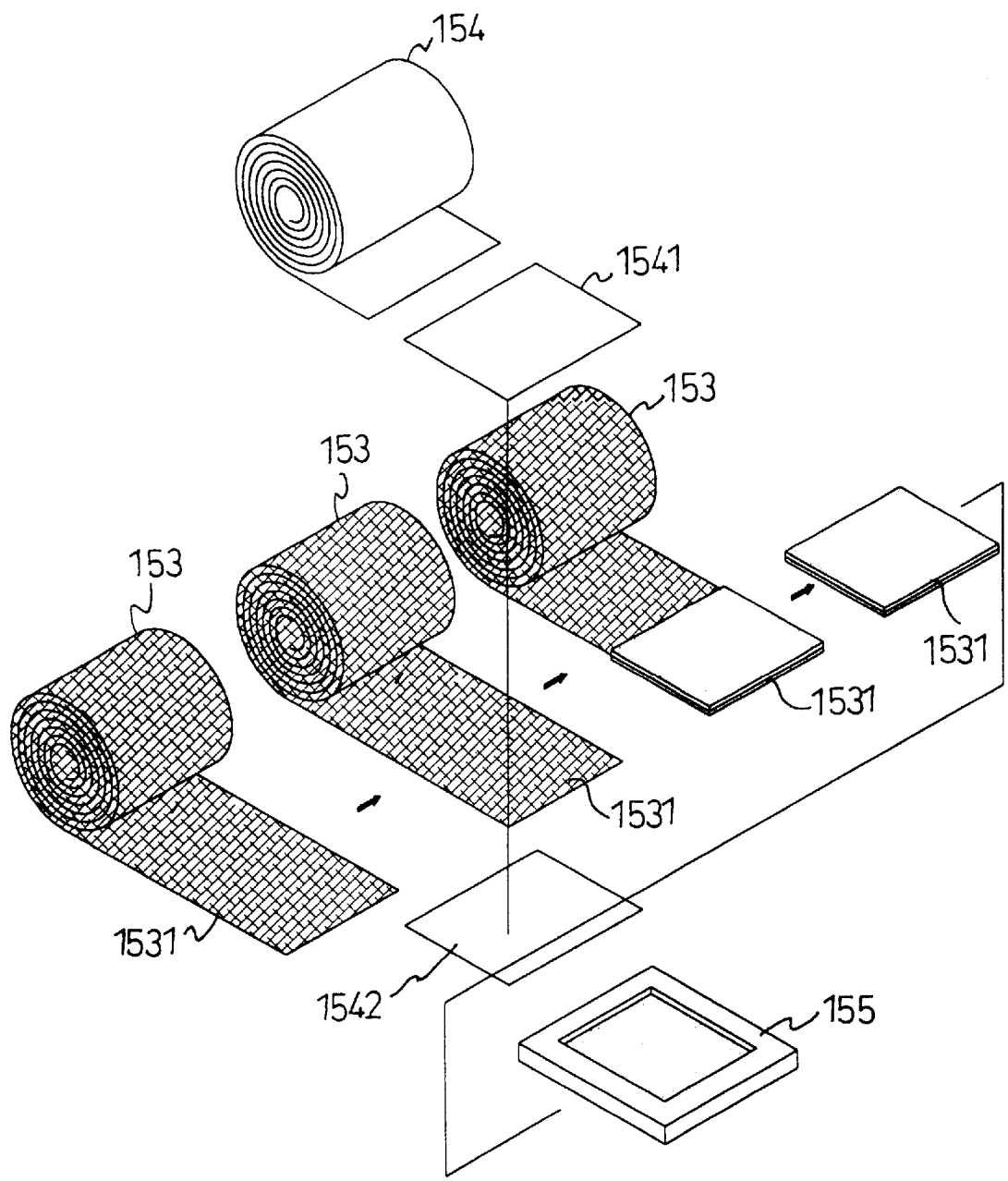
FIG. 15 shows a process for producing a regenerating-plate module in accordance with the present invention.
Figure 16:
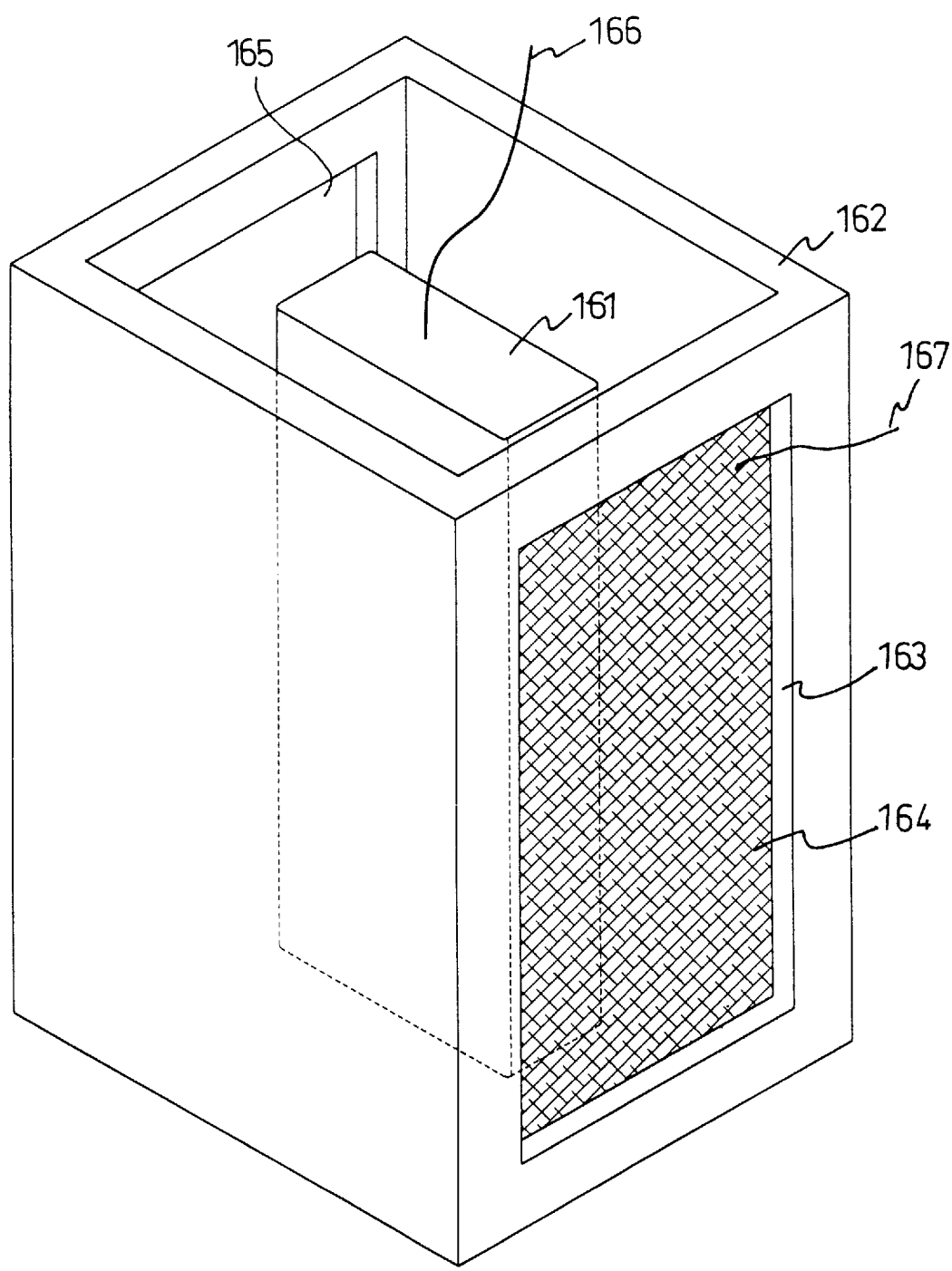
FIG. 16 is a perspective view of a conventional Zinc-air battery.

FIG. 15 shows a process for producing the regenerating-plate module, which first provides a metal screen (1531) from a roll of metal screen (153). Two pieces of separator (1541, 1542) are then separated them from a roll of separator (154). The separators (1541, 1542) are attached to the two faces of the piece of metal screen (1531), respectively. Finally, the metal screen (1531) is separated from the roll of metal screen (153) and enclosed in a frame (155) to form a regenerating-plate module.

Although the present invention has been explained in relation to its preferred embodiment, it is to be understood that many other possible modifications and variations can be made without departing from the spirit and scope of the invention as hereinafter claimed.

What is claimed is:

1. A modularized metal-air battery comprising:
at least one metal-plate module (11) having a metal anode (111) enclosed in a frame (112), the frame (112) of said at least one metal-plate module (111) having a thickness larger than said metal anode (111);
a first and a second air-plate module (12, 13), each having an air cathode (121, 131) enclosed in a frame (122, 132), the frame (122, 132) of each air-plate module (12, 13) having a thickness larger than said air cathode (121, 131);
said first air-plate module (12), said at least one metal-plate module (11) and said second air-plate module (13) being combined to constitute said metal-air battery in such a manner that said frames (122, 112, 132) thereof are securely attached together thereby defining at least two chambers (71); and liquid electrolyte selectively filled in said at least two chambers (71).

2. The modularized metal-air battery as claimed in claim 1 further comprising at least one regenerating-plate module (14) having a metal screen (141) enclosed in a frame (142), the frame (142) of said regenerating-plate module (14) having a thickness larger than said metal screen (141), said at least one regenerating-plate module (14), said first and second air-plate modules (12, 13) and said at least one metal-plate module (11) being combined to constitute said metal-air battery in such a manner that the frames (142) of said at least one regenerating-plate module (14) and said at least one metal-plate module (11) are securely clamped between the frames of said first and second air-plate modules (12, 13).

3. The modularized metal-air battery as claimed in claim 2, wherein each air cathode (121, 131) is attached to a separator (72) which allows the air to flow through while preventing short circuit.

4. The modularized metal-air battery as claimed in claim 3, wherein said metal screen (141) has a separator (128) attached to each side.

5. The modularized metal-air battery as claimed in claim 4, wherein each frame (122, 112, 142, 152, 132) has an air inlet channel (21), an air discharge channel (22), an electrolyte injection channel (23) and an electrode slurry discharge channel (24).

6. The modularized metal-air battery as claimed in claim 5 further comprising a positive electrical lead (61), a negative electrical lead (62) and a regenerating lead (69) connected to said metal anode (111), said air cathode (121, 131) and said metal screen (141), respectively.

7. The modularized metal-air battery as claimed in claim 6, wherein each air-plate module (12, 13) has its air cathode (121, 131) attached to a sideface of the frame thereof.

8. The modularized metal-air battery as claimed in claim 7, wherein there are four protruded portions (125) integrally formed on the four corners of the frame of each air-plate module (12, 13).

9. The modularized metal-air battery as claimed in claim 6, wherein the frame (122, 132) of each air-plate module (12, 13) has an air inlet path (211) communicating with said air inlet channel (21) of the frame (122, 132) thereby allowing air to flow into the chamber (71), the frame (142) of each regenerating-plate module (14) having an air discharge path (221) communicating with said air discharge channel (22) of the frame (142) thereby allowing oxygen and fumes to discharge from the chamber (71), the fume can then be guided through suitable condensation device to extract the water content from the fume to prevent most of it be released out of the battery system, thereby allowing the electrolyte density inside the battery system to be maintained in suitable range longer in time, the frame (112) of each metal-plate module (11) having an electrolyte injection path (231) communicating with said electrolyte injection channel (23) of the frame (112) thereby allowing said liquid electrolyte to be injected into a chamber (71), the frame (112) of each metal-plate module (11) having an electrode slurry discharge path (241) communicated with said electrode slurry discharge channel (24) of the frame (112) thereby allowing electrode slurry to be discharged from a chamber (71).

10. The modularized metal-air battery as claimed in claim 6, wherein the frame (122, 132) of each air-plate module (12, 13) has an air inlet cutout communicating with said air inlet channel (21) of the frame (122, 132) thereby allowing air to flow into the chamber (71), the frame (142) of each regenerating-plate module (14) having an air discharge cutout communicating with said air discharge channel (22) of the frame (142) thereby allowing oxygen and fumes to discharge from the chamber (71), the fume can then be guided through suitable condensation device to extract the water content from the fume to prevent most of it be released out of the battery system, allowing the electrolyte density inside the battery system to be maintained in suitable range longer in time, the frame (112) of each metal-plate module (11) having an electrolyte injection cutout (232) communicating with said electrolyte injection channel (23) of the frame (112) thereby allowing said liquid electrolyte to be injected into a chamber (71), the frame (112) of each metal-plate module (11) having an electrode slurry discharge cutout (242) communicated with said electrode slurry discharge channel (24) of the frame (112) thereby allowing electrode slurry to be discharged from a chamber (71).

11. The modularized metal-air battery as claimed in claim 10, wherein said at least one metal-plate module (11) includes a first and a second metal-plate modules (11, 15) and said at least one regenerating-plate module (14) includes a regenerating-plate module (14), said metal-air battery being formed by sequentially combining said first air-plate module (12), said first metal-plate module (11), said regenerating-plate module (14), said second metal-plate module (15) and said second air-plate module (13).

12. The modularized metal-air battery as claimed in claim 10, wherein said at least one metal-plate module (11) includes a metal-plate module and said at least one regenerating-plate module (14) includes a first and a second regenerating-plate modules, said metal-air battery being formed by sequentially combining said first air-plate module (12), said first regenerating-plate module, said metal-plate module, said second regenerating-plate module and said second air-plate module (13).

13. The modularized metal-air battery as claimed in claim 10, wherein said at least one metal-plate module (11) includes a first, a second and a third metal-plate module and said at least one regenerating-plate module (14) includes a first and a second regenerating-plate module, said metal-air battery being formed by sequentially combining said first air-plate module (12), said first metal-plate module, said first regenerating-plate module, said second metal-plate module, said second regenerating-plate module, said third metal-plate module and said second air-plate module (13).

14. The modularized metal-air battery as claimed in claim 1, wherein each module is integrally formed.

15. The modularized metal-air battery as claimed in claim 2, wherein each module is integrally formed.

16. A method for manufacturing a modularized metal-air battery, comprising:
a process for producing an air-plate module having the steps of:
(a) providing a piece of film (1331) from a roll of film (133);
(b) punching an aperture (1332) into said piece of film (1331);
(c) providing a piece of metal screen (1341) by separating it from a roll of metal screen (134);
(d) attaching said piece of metal screen (1341) to said piece of film (1331) such that said aperture (1332) is covered by said piece of metal screen (1341);
(e) coating air cathode material (135) on said piece of metal screen (1341) attached to said piece of film (1331);
(f) providing a piece of separator (1361) by separating it from a roll of separator (136);
(g) attaching said piece of separator (1361) to said piece of metal screen (1341);
(h) separating said piece of film (1331) from said roll of film (133); and
(i) attaching a frame (137) to said piece of film (1331); and
a process for producing a metal-plate module having the steps of:
(a) providing a piece of metal screen (1441) from a roll of metal screen (144);
(b) plastering metal powder (145) onto said piece of metal screen (1441);
(c) pressing said metal powder (145) on said piece of metal screen (1441) to form a metal plate (146);
(d) separating said piece of metal screen (1441) from said roll of metal screen (144); and
(e) attaching a frame (147) to said piece of metal screen.

17. The method for manufacturing a modularized metal-air battery as claimed in claim 16 further comprising a process for producing a regenerating-plate module having the steps of:
(a) providing a piece of metal screen (1531) from a roll of metal screen (153), said piece of metal screen (1531) having two faces;
(b) providing two pieces of separator (1541, 1542) by separating them from a roll of separator (154);
(c) attaching said two pieces of separator (1541, 1542) to each face of said piece of metal screen (1531), respectively;
(d) separating said piece of metal screen (1531) from said roll of metal screen (153); and
(e) attaching a frame (155) to said piece of metal screen (1531).

18. The method for manufacturing a modularized metal-air battery as claimed in claim 17, wherein each piece of film is made of polyester.

19. The method for manufacturing a modularized metal-air battery as claimed in claim 17, wherein each piece of film is made of polyamide.

20. The method as claimed in claim 16, wherein each module is integrally formed.

* * * * *